Oct. 26, 1926. Re. 16,449

F. VON OSTEN

DISINTEGRATING MACHINE

Original Filed Feb. 16, 1921 2 Sheets-Sheet 1

Frederick von Osten INVENTOR

BY Emil A. Rau

ATTORNEYS

Oct. 26, 1926. Re. 16,449

F. VON OSTEN

DISINTEGRATING MACHINE

Original Filed Feb. 16, 1921 2 Sheets-Sheet 2

INVENTOR.
Frederick von Osten
BY
Ernest A. Fenn
ATTORNEYS.

Reissued Oct. 26, 1926.

Re. 16,449

UNITED STATES PATENT OFFICE.

FREDERICK VON OSTEN, OF EAST ORANGE, NEW JERSEY, ASSIGNOR TO SOPHIE S. VON OSTEN, OF EAST ORANGE, NEW JERSEY.

DISINTEGRATING MACHINE.

Original No. 1,425,920, dated August 15, 1922, Serial No. 445,290, filed February 16, 1921. Application for reissue filed August 15, 1924. Serial No. 732,321.

The present invention relates, generally, to improvements in machines for disintegrating textile waste and scrap to produce lint of long staple fiber; and the invention has for its principal object to provide a novel and comparatively simple construction of machine for disintegrating and teasing out the fibers of scrap cloth or other woven or knitted fabric, yarns, cords and other fibrous material to produce a lint, the fibers of which retain a long staple quality unbroken by the disintegrating or teasing out action of the machine.

Another object of the invention is to provide in connection with a machine of the kind described a novel means for feeding to and presenting and holding, subject to the operation of the novel disintegrating or teasing element, the scrap or other material to be reduced to a lint of long staple fiber.

Other objects of this invention, not at this time more particularly enumerated, will be clearly understood from the following detailed description of the same.

With the various objects of the invention in view, the same consists, primarily, in the novel disintegrating machine hereinafter set forth; and, furthermore, the invention consists in the novel arrangements and combinations of the various devices and parts, as well as in the details of the construction thereof, all of which will be hereinafter more fully described and claimed.

The invention is clearly illustrated in the accompanying drawings, in which:—

Figure 1:
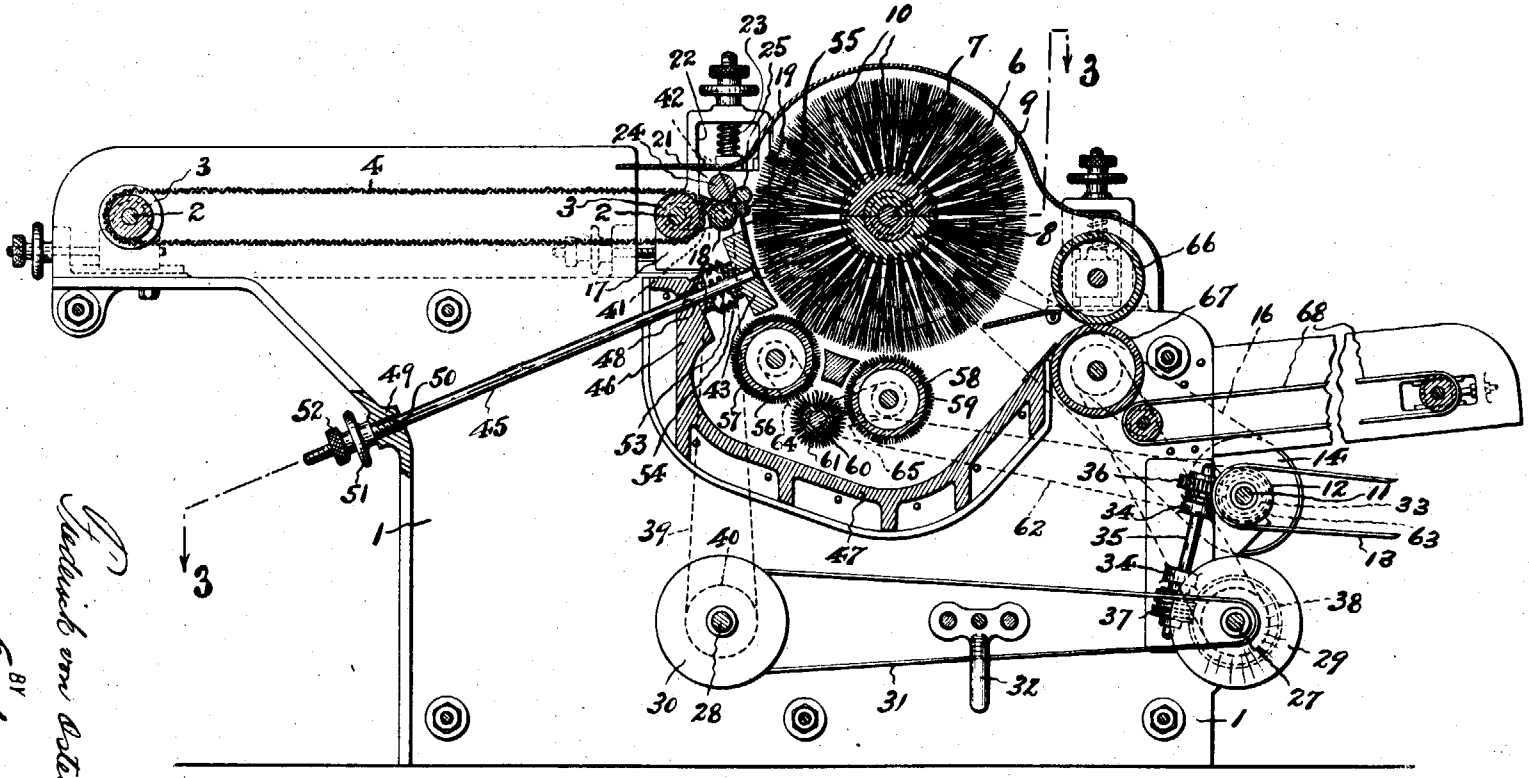
Figure 3:
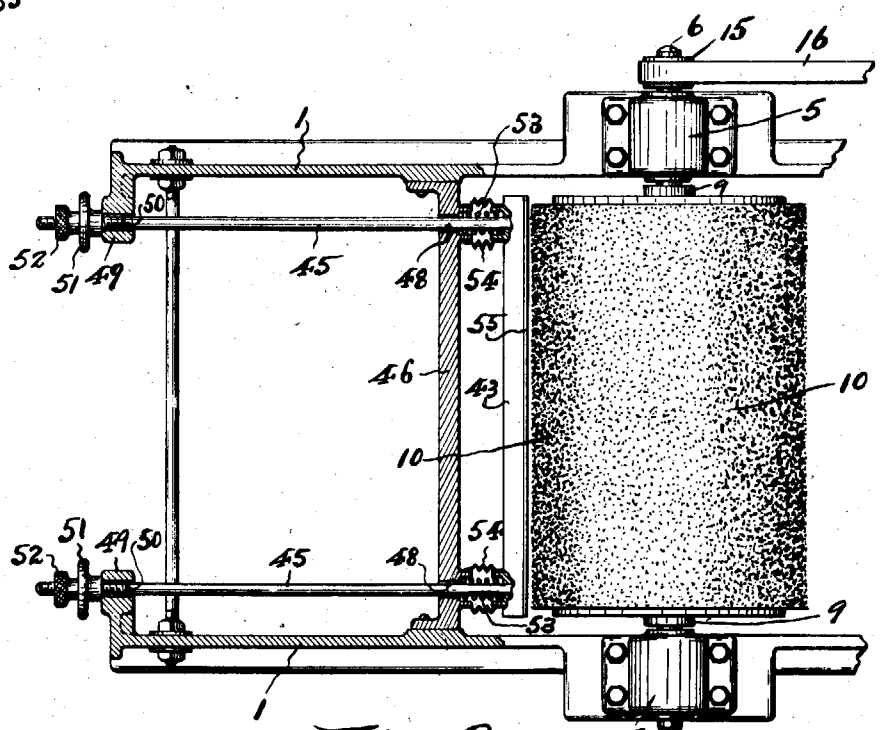
Figure 2:
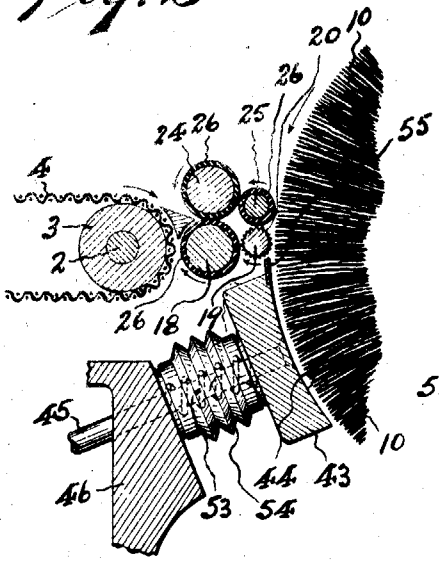

Figure 1 is a longitudinal vertical section of the novel disintegrating machine, made according to and embodying the principles of the present invention; Figure 2 is a detail vertical longitudinal section, on an enlarged scale, of the novel arrangement of means for feeding to and presenting and holding, subject to the operation of the disintegrating element, the scrap or other material to be disintegrated; and Figure 3 is a detail horizontal section, taken on line 3—3 in said Figure 1.

Similar characters of reference are employed in all of the hereinabove described views to indicate corresponding parts.

Referring now to said drawings, the reference character 1 indicates the side frames of the machine, which serve to support in desired associated relation the several operative elements and devices making up the machine. Journaled in and extending between said side frames 1, at the forward end of said machine, are longitudinally spaced transverse shafts 2 upon which are fixed rollers 3 over which runs an endless apron or conveyor belt 4. The said apron or conveyor is preferably made of woven wire mesh, or any other material providing open interstices through which dirt and other foreign material, accompanying the scrap fed forward by the movement of said apron or belt, may fall, and thus be separated from the scrap, as the latter enters the machine.

Secured upon said side frames 1 are bearing members 5 in which is journaled a transverse shaft 6 for carrying a novel construction of disintegrating or teasing element. This disintegrating or teasing element comprises a longitudinal hub member comprised of a pair of sections 7 and 8, which embrace a split bushing 9, and which are suitably clamped together to bind the same together with the bushing 9 upon the shaft 6 so as to be rotated thereby. Fixed in the said hub sections 7 and 8 so as to project radially outward therefrom are a plurality of tufts or bunches of teasing bristles 10. Said teasing bristles may be made of steel wire, or other thin resilient or springy material, and the same are of a substantial length so as to provide a continuous bristle surface of a resilient or springy nature at the outer circumference of the disintegrating or teasing element, said bristles when in contact with the material operated upon tending to yield to the resistance offered when their ends engage with the material during the disintegrating or teasing operation, whereby the material worked upon is not harshly riven or torn, but rather the fibers comprising the same are teased out or disintegrated and separated in a comparatively gentle manner so as not to break the long fibers thereof, whereby said long fibers are teased or brushed out into a loosely matted lint.

Supported in bearings located at the rear ends of said side frames is a transverse driving shaft 11, upon which is fixed a driving pulley 12, over which runs a driving belt 13 operated from any suitable source of power to drive the machine. Fixed on said driving shaft 11 is a pulley or other transmission element 14, and fixed on said shaft 6 is a similar pulley or transmission element 15. A transmission belt or the like 16 running over the said pulleys or elements 14 and 15 serve to rotate the disintegrating or teasing element at the desired high speed.

Located intermediate the inner or rear end of said apron or conveyor 4 and said disintegrating or teasing element is a mechanism for feeding to the latter the scrap or other material to be operated upon. This mechanism comprises a pair of transversely opposite longitudinally adjustable bearing housings 17 arranged upon said side frames 1, in which is journaled a transverse feed roller 18 located adjacent to the inner or rear end of said apron or conveyor 4. Journaled in and extending between said bearing housings 17, intermediate said feed roller 18 and said disintegrating or teasing element is a gripping roller 19 of smaller diameter, and located very close to the periphery of said disintegrating or teasing element. Said gripping roller 19 is provided with a gripping surface 20 comprised of a plurality of gripping points or projections, and said gripping surface may be variously produced by nurling, milling or otherwise roughening the said gripping roller. The reference character 21 indicates a vertically movable or yieldable bearing guided in ways or guides 22 provided in each housing 17, said bearings 21 being normally subjected to the downward thrusting pressure of springs 23. Journaled to extend between said bearings 21 is an idler feed roller 24, disposed above and engaging the upper side of said feed roller 18, and likewise journaled to extend between said bearings 21 is an idler gripping roller 25, disposed above and engaging the upper side of said gripping roller 19. If desired, the surfaces of said feed rollers 18 and 24, and of said idler gripping roller 25, may be covered with a sleeve or tread 26 of resilient material such as soft rubber or other suitable material.

As an illustration of one arrangement of transmission means for driving said apron or conveyor 4, said feed roller 18, and said gripping roller 19, I have shown in Figure 1 a pair of longitudinally spaced transverse shafts 27 and 28 extending between said side frames 1. Mounted on said shaft 27 is a cone-pulley 29, and on said shaft 28 an oppositely directed cone-pulley 30. Running over said cone-pulleys 29 and 30 is a transmission belt 31 subject to the control of a belt-shifter 32, whereby the belt may be shifted transversely on the oppositely tapered surfaces of said cone pulleys to vary the speed of power transmission through said elements. Fixed on said driving shaft 11 is a worm drive 33, and journaled in bearing devices 34 supported in connection with a side frame 1, is a vertical shaft 35 having at its upper end a worm gear 36 operatively engaged by said worm drive 33, and having at its lower end a worm drive 37 operatively engaged with a worm gear 38 fixed on said shaft 27 whereby said variable speed mechanism above described is initially driven at a reduced speed from said driving shaft 11. Said feed roller 18 is driven by a belt 39, from a pulley 40 fixed on said shaft 28. Said apron 4 is driven by belt drive 41 or its equivalent from said feed roller, while said gripping roller 19 is likewise driven by a belt drive 42 or its equivalent from said feed roller.

Located immediately below the above described feeding and gripping devices is an adjustable yieldable device for holding the material subject to the operation of the disintegrating or teasing element. This device comprises a transverse presser plate 43 provided with a curved or concaved face 44 concentric with the adjacent circumferential surface of said disintegrating or teasing element. Rigidly connected with said presser plate 43, preferably adjacent to its ends, are forwardly extending supporting rods 45. The reference character 46 indicates the front wall of a bottom plate 47 which extends downwardly and rearwardly beneath the disintegrating or teasing element, and which is suitably secured to and between the side frames 1 of the machine. Said front wall 46 of said bottom plate 47 is provided with guideway openings 48 through which said supporting rods 45 slidably extend. Connected with said side frames 1 are supporting brackets 49 provided with guideway openings 50 which slidably support the free ends of said supporting rods 45. The free ends of said supporting rods 45 are screw-threaded to receive an adjustable stop-nut 51, which may be locked in desired adjusted position by a lock-nut 52. Arranged around each supporting rod 45 intermediate the back of said presser plate 43 and said front wall 46 of the bottom plate 47 is a compression spring 53 which exerts a forwardly moving pressure upon said presser plate to hold the same yieldingly presented to the surface of said disintegrating or teasing element, and normally spaced from the latter at a suitable distance as governed by the adjustment of the stop nuts 51. The arrangement and mounting of said presser plate and its supporting rods is such that the same bears a radial relation to the center or axis of the disintegrating or teasing element, so that yielding movement of said presser plate moves all portions of its face 44 equally and directly away from said disintegrating or teasing element. In order to prevent congestion of fibrous material, dust or scrap around the springs 53, the same are protected by a longitudinally expansible and contractable covering or protecting sleeve 54, preferably in the form of an accordion pleated envelope as shown in the drawings.

One end of said covering or sleeve 54 is suitably secured to the back of said presser plate, while the other end is secured to the front wall 46 of the bottom plate 47. The upper edge of said presser plate may be provided with the longitudinally extending upwardly projecting flexible lip member 55, which prevents the material from escaping outwardly between the top of the presser plate and the gripping roller 19, and which guides the material downwardly to extend across the face 44 of said presser plate 43.

Extending transversely beneath said disintegrating or teasing element is a transverse drum 56 provided with a surface face comprised of short metallic bristles 57. The said drum 56 is adjusted relative to the under circumference or face of the disintegrating or teasing element, so that the metallic bristles of the former will intermesh, in passing, with the bristles of the latter whereby the latter are cleaned, and any fibers, threads or strings adhering thereto will be removed therefrom. A similar drum 58 having a face of short metallic bristles 59 is also provided, and so supported in adjusted relation to the under surface of the disintegrating or teasing element as to cause its bristles 59 to likewise mesh, in passing, with the bristles of the disintegrating or teasing element, for the same purpose. The latter drum 58 is spaced rearwardly from said drum 56. Arranged to extend between said drums 56 and 58, is a brush roller 60 having a surface of long metallic bristles 61. The bristles 61 of said brush roller 60 intermesh, in passing, respectively with the bristles of the drums 56 and 58, and serve to clean the same by removing therefrom any material or fiber adhering thereto. For proper operative effect the respective drums 56 and 58 are rotated at comparatively slow speed, while the disintegrating or teasing element rotates at very high speed, consequently not only will the fibers of teased material be further brushed out as they pass between said drums and the disintegrating or teasing elements, but, due to the drag of the former upon the latter, said fibers will be removed from the disintegrating or teasing element for discharge from the machine. The brush roller 60 is rotated at a higher speed than are the drums 56 and 58 so that its bristles will readily remove adhering material from the latter. Said brush roller 60 is rotated by a driving belt 62 from a pulley 63 on said driving shaft 11, while said drums 56 and 58 are respectively driven by driving belts 64 and 65 from said brush roller 60, although it will be understood that any other suitable arrangement or type of transmission means may be employed.

The disintegrated and linted material, when freed from the disintegrating or teasing element passes outwardly between suitably driven batting rollers 66 and 67, whence the bat of disintegrated material may be fed away from the machine by the discharge conveyor or endless belt 68, all of which is common practice.

In operation, the textile scrap or other material to be operated upon, is fed forward by the belt 4 to the feed rollers 18 and 24, between which the same passes, to be fed thereby between the gripping rollers 19 and 25. The gripping roller 19 is provided with a gripping surface 20 which cooperates with the idler gripping roller 25 to firmly grip the material while slowly feeding the same to the action of the teasing bristles 10 of the rapidly rotated disintegrating or teasing element or drum, so that immediately the scrap or material issues from between the gripping rollers, the teasing bristles begin to brush the same out into the desired long staple lint. As this brushing out of the scrap or material proceeds, the same is carried downwardly across the face of the presser plate 43, which is adjusted relative to the ends of the teasing bristles 10 so as to hold the material subject to the whipping and teasing action of said teasing bristles. Since, however, said presser plate is yieldingly presented or backed, if the material crowds or bunches up, the plate moves away so as to relieve the resistance offered by the scrap or material to the teasing bristles 10, whereby the latter continues a comparatively gentle teasing or brushing out operation upon the fibers, rather than a tearing, ripping or disrupting action tending to break the long staple desired in the fibers of the finished lint. The presser plate being thus yieldable, and the teasing bristles 10 being of such length as to possess a resilient or springy quality, it follows that the united action of the gripping rollers, presser plate and teasing bristles 10, results in a rapid and yet comparatively gentle disintegration of the material treated, so that a lint of long staple fiber is produced and finally delivered in a bat from the machine. The yieldable presser plate provides the proper backing for the material while subjected to the action of the teasing bristles 10, so that the said material is not too strongly pressed toward said bristles 10, yet is nevertheless so presented and held as not to escape the required brushing out or teasing action necessary to the best results.

I am aware that some changes may be made in the several arrangements and combinations of the devices and parts, as well as in the details of the construction of the same, without departing from the scope of the present invention as above described, and as defined in the following claims. Hence, I do not limit my invention to the exact arrangements and combinations of the devices and parts set forth in the above specification, nor do I confine myself to the exact details of the construction of said parts as illustrated in the accompanying drawings.

I claim:—

1. In a machine of the kind described, a high speed rotatable teasing element having a circumferentially continuous surface of radially projected springy bristles, a pair of feed rollers, a pair of gripping rollers intermediate said feed rollers and the surface of said teasing element, one of said gripping rollers having a resilient surface, the other of said gripping rollers having a roughened surface, means for rotating said feed rollers and said gripping rollers to slowly feed material to said teasing element, and means for supporting said material in contact with the teasing and brushing action of the bristles of said teasing element.

2. In a machine of the kind described, a high speed rotatable teasing element having a circumferentially continuous surface of radially projected springy bristles, a pair of feed rollers, a pair of gripping rollers intermediate said feed rollers and the surface of said teasing element, means for rotating said feed rollers and said gripping rollers to slowly feed material to said teasing element, and a yieldable presser-plate beneath said gripping rollers and contiguous to the bristle surface of said teasing element to hold the material subject to the teasing and brushing action of the latter.

3. In a machine of the kind described, a high speed rotatable teasing element having a surface of radially projected springy bristles, a pair of feed rollers, a pair of gripping rollers intermediate said feed rollers and the surface of said teasing element, means for rotating said feed rollers and said gripping rollers to slowly feed material to said teasing element, a yieldable presser plate beneath said gripping rollers and conforming to the bristle surface of said teasing element to hold the material subject to the teasing and brushing action of the latter, a pair of drums beneath said teasing element adapted to be rotated at a slower speed than the latter, said drums having faces comprised of short metallic bristles intermeshing slightly with the bristles of said teasing element, a brush roller intermediate said drums adapted to be rotated at higher speed than the latter, said brush roller having a face comprised of long metallic bristles slightly intermeshing with the bristles of said drums, and means for discharging the disintegrated material from said machine.

4. In a machine of the kind described, a frame, an endless conveyor belt at the forward end of said frame, a rotatable teasing element mounted on said frame, said teasing element having a circumferentially continuous compact surface of radially projected springy bristles with their butts rigidly secured to said teasing element, means adjacent to the inner end of said conveyor belt for feeding material to said teasing element, and means for supporting the material so fed in contact with teasing element.

5. In a machine of the kind described, a frame, an endless conveyor belt at the forward end of said frame, a rotatable teasing element having a continuous surface of springy bristles mounted on said frame, a pair of feed rollers adjacent to the inner end of said conveyor belt, a pair of gripping rollers intermediate said feed rollers and said teasing element, one of said feed rollers having axially grooved gripping surface, and a yieldable means below said feed rollers and conforming to the face of said teasing element for presenting the material issuing from said gripping rollers to the contact of said teasing element.

6. In a machine of the kind described, a frame, an endless conveyor belt at the forward end of said frame, a rotatable teasing element having a surface of springy bristles mounted on said frame, a pair of feed rollers adjacent to the inner end of said conveyor belt, a pair of gripping rollers intermediate said feed rollers and said teasing element, one of said feed rollers having a serrated gripping surface, a yieldable means below said feed rollers and conforming to the face of said teasing element for presenting the material issuing from said gripping rollers to the action of said teasing element, a pair of drums beneath said teasing element adapted to be rotated at slower speed than the latter, said drums having faces comprised of short metallic bristles intermeshing slightly with the bristles of said teasing element, a brush roller intermediate said drums adapted to be rotated at higher speed than the latter, said brush roller having a face comprised of long bristles slightly intermeshing with the bristles of said drums, and means for discharging the disintegrated material from the machine.

7. In a machine of the kind described, a frame, an endless conveyor belt at the forward end of said frame, a rotatable teasing element having a continuous surface of springy bristles mounted on said frame, a pair of feed rollers adjacent to the inner end of said conveyor belt, a pair of gripping rollers intermediate said feed rollers and said teasing element, one of said feed rollers having axially grooved gripping surface, a pressure plate beneath said gripping rollers and conforming to the face of said teasing element, supporting rods to which said presser plate is attached, means for slidably mounting said supporting rods on said frame in radial alinement with the axis of said teasing element, spring means for yieldably backing said presser plate, and adjustable stop means on said supporting rods engageable with said frame to adjust the initial spaced relation of said presser plate to the surface of said teasing element.

8. In a machine of the kind described, a frame, an endless conveyor belt at the forward end of said frame, a rotatable teasing element having a surface of springy bristles mounted on said frame, a pair of feed rollers adjacent to the inner end of said conveyor belt, a pair of gripping rollers intermediate said feed rollers and said teasing element, one of said feed rollers having a serrated gripping surface, a presser plate beneath said gripping rollers and conforming to the face of said teasing element, supporting rods to which said presser plate is attached, means for slidably mounting said supporting rods on said frame in radial alinement with the axis of said teasing element, spring means for yieldably backing said presser plate, adjustable stop means on said supporting rods engageable with said frame to adjust the initial spaced relation of said presser plate to the surface of said teasing element, a pair of drums beneath said teasing element adapted to be rotated at slower speed than the latter, said drums having faces comprised of short metallic bristles intermeshing slightly with the bristles of said teasing element, a brush roller intermediate said drums adapted to be rotated at higher speed than the latter, said brush roller having a face comprised of long bristles slightly intermeshing with the bristles of said drums, and means for discharging the disintegrated material from the machine.

9. In a machine of the kind described, a frame, a teasing element comprising a hub provided with radiating bunches of resilient bristles having their butts rigidly fixed therein, thereby providing a continuous cylindrical bristle surface, means for rotatably mounting said teasing element on said frame, and means adjacent to the surface of said teasing element for feeding to and holding material subject to the action of said teasing element.

10. In a machine of the kind described, a high speed rotatable teasing element having a continuous surface of radially projected springy bristles, a pair of feed rollers, a pair of gripping rollers intermediate said feed rollers and the surface of said teasing element, means for rotating said feed rollers and said gripping rollers to slowly feed material to said teasing element, and means for supporting said material in contact with the teasing and brushing action of the bristles of said teasing element.

11. In a machine of the kind described, a high speed rotatable teasing element having a circumferentially continuous surface of radially projected springy bristles, a pair of feed rollers, a pair of gripping rollers, intermediate said feed rollers and the surface of said teasing element, means for rotating said feed rollers and said gripping rollers to slowly feed material to said teasing element, and a presser-plate beneath said gripping rollers and conforming to the bristle surface of said teasing element to hold the material subject to the teasing and brushing action of the latter.

12. In a machine of the kind described, a high speed rotatable teasing element having a surface of radially projected springy bristles, a pair of feed rollers, a pair of gripping rollers intermediate said feed rollers and the surface of said teasing element, means for rotating said feed rollers and said gripping rollers to slowly feed material to said teasing element, a presser plate beneath said gripping rollers and conforming to the bristle surface of said teasing element to hold the material subject to the teasing and brushing action of the latter, a pair of drums beneath said teasing element adapted to be rotated at a slower speed than the latter, said drums having faces comprised of short metallic bristles intermeshing slightly with the bristles of said teasing element, a brush roller intermediate said drums adapted to be rotated at higher speed than the latter, said brush roller having a face comprised of long metallic bristles slightly intermeshing with the bristles of said drums, and means for discharging the disintegrated material from said machine.

13. In a machine of the kind described, a frame, a conveyor at the forward end of said frame, a rotatable teasing element mounted on said frame, said teasing element having a circumferentially continuous compact surface of radially projected springy bristles with their butts rigidly secured to said teasing element, means adjacent to the inner end of said conveyor for feeding material to said teasing element, and means for supporting the material so fed in contact with said teasing element.

14. In a machine of the kind described, a frame, an endless conveyor belt at the forward end of said frame, a rotatable teasing element having a circumferentially continuous surface of springy bristles mounted on said frame, a pair of feed rollers adjacent to the inner end of said conveyor belt, a pair of gripping rollers intermediate said feed rollers and said teasing element, one of said feed rollers having a serrated gripping surface, and means below said feed rollers and opposed to conforming with the face of said teasing element for presenting the material issuing from said gripping rollers to the action of said teasing element.

15. In a machine of the kind described, a frame, an endless conveyor belt at the forward end of said frame, a rotatable teasing element having a surface of springy bristles mounted on said frame, a pair of feed rollers adjacent to the inner end of said conveyor belt, a pair of gripping rollers intermediate said feed rollers and said teasing element, one of said feed rollers having a serrated gripping surface, means below said feed rollers and opposed to the face of said teasing element for presenting the material issuing from said gripping rollers to the action of said teasing element, a pair of drums beneath said teasing element adapted to be rotated at slower speed than the latter, said drums having faces comprised of short metallic bristles intermeshing slightly with the bristles of said teasing element, a brush roller intermediate said drums adapted to be rotated at higher speed than the latter, said brush roller having a face comprised of long bristles slightly intermeshing with the bristles of said drums, and means for discharging the disintegrated material from the machine.

16. In a machine of the kind described, a frame, an endless conveyor belt at the forward end of said frame, a rotatable teasing element having a surface of springy bristles mounted on said frame, a pair of feed rollers adjacent to the inner end of said conveyor belt, a pair of gripping rollers intermediate said feed rollers and said teasing element, one of said feed rollers having a serrated gripping surface, a presser plate beneath said gripping rollers opposed to and conforming with the face of said teasing element, supporting rods to which said presser plate is attached, means for slidably mounting said supporting rods on said frame in radial alinement with the axis of said teasing element, means backing said presser plate, and adjustable stop means on said supporting rods engageable with said frame to adjust the initial spaced relation of said presser plate to the surface of said teasing element.

17. In a machine of the kind described, a frame, an endless conveyor belt at the forward end of said frame, a rotatable teasing element having a surface of springy bristles mounted on said frame, a pair of feed rollers adjacent to the inner end of said conveyor belt, a pair of gripping rollers intermediate said feed rollers and said teasing element, one of said feed rollers having a serrated gripping surface, a presser plate beneath said gripping rollers opposed to and conforming with the face of said teasing element, supporting rods to which said presser plate is attached, means for slidably mounting said supporting rods on said frame in radial alinement with the axis of said teasing element, means backing said presser plate, adjustable stop means on said supporting rods engageable with said frame to adjust the initial spaced relation of said presser plate to the surface of said teasing element, a pair of drums beneath said teasing element adapted to be rotated at slower speed than the latter, said drums having faces comprised of short metallic bristles intermeshing slightly with the bristles of said teasing element, a brush roller intermediate said drums adapted to be rotated at higher speed than the latter, said brush roller having the face comprised of long bristles slightly intermeshing with the bristles of said drums, and means for discharging the disintegrated material from the machine.

18. In a machine of the kind described, a rotatable teasing element having a circumferentially continuous surface of radially projected resilient bristles, of means for feeding material to said teasing element, means for gripping the material while being slowly fed to said teasing element, and a yieldable presser plate beneath said gripping means to hold the material subject to the teasing and brushing action of the bristles of said teasing element.

FREDERICK VON OSTEN.